US012597349B2

(12) United States Patent
Takeuchi et al.

(10) Patent No.: US 12,597,349 B2
(45) Date of Patent: Apr. 7, 2026

(54) VEHICLE-EXIT ASSIST APPARATUS

(71) Applicants: TOYOTA JIDOSHA KABUSHIKI KAISHA, Toyota (JP); CONTINENTAL AUTOMOTIVE GMBH, Hannover (DE)

(72) Inventors: Koji Takeuchi, Toyota (JP); Masanori Tokuda, Miyoshi (JP); Masaho Ishida, Toyota (JP); Junya Fukuta, Nagoya (JP); Ryuichi Soya, Yokohama (JP); Ovidiu Marius Chicea, Sibiu (RO)

(73) Assignees: TOYOTA JIDOSHA KABUSHIKI KAISHA, Toyota (JP); Continental Autonomous Mobility Germany GmbH, Ingolstadt (DE)

( * ) Notice: Subject to any disclaimer, the term of this patent is extended or adjusted under 35 U.S.C. 154(b) by 112 days.

(21) Appl. No.: 18/696,402

(22) PCT Filed: Aug. 12, 2022

(86) PCT No.: PCT/JP2022/030803
§ 371 (c)(1),
(2) Date: Mar. 28, 2024

(87) PCT Pub. No.: WO2023/053747
PCT Pub. Date: Apr. 6, 2023

(65) Prior Publication Data
US 2025/0006057 A1     Jan. 2, 2025

(30) Foreign Application Priority Data
Sep. 30, 2021     (RO) .............................. a 2021 00606

(51) Int. Cl.
G08G 1/16          (2006.01)
G01S 13/931        (2020.01)
(Continued)

(52) U.S. Cl.
CPC .............. G08G 1/16 (2013.01); G01S 13/931 (2013.01); G08G 1/052 (2013.01); *G01S 2013/9315* (2020.01); *G08G 1/04* (2013.01)

(58) Field of Classification Search
CPC ......... G01S 13/931; G08G 1/16; G08G 1/052
See application file for complete search history.

(56) References Cited

U.S. PATENT DOCUMENTS

2008/0218381 A1\*  9/2008  Buckley ................. B60Q 1/544
                                            340/932.2
2022/0242434 A1\*  8/2022  Kang ..................... B60W 40/02
2022/0332309 A1\* 10/2022  Ishida ................... B60W 40/08

FOREIGN PATENT DOCUMENTS

CN          110316055  A     10/2019
JP          2006-190193  A     7/2006
(Continued)

*Primary Examiner* — Luke Huynh
(74) *Attorney, Agent, or Firm* — Sughrue Mion, PLLC

(57) ABSTRACT

Provided is a vehicle-exit assist apparatus including: a target information acquisition device (12) configured to acquire target information on a target existing on a rear side of an own vehicle; and a control unit (10) configured to execute vehicle-exit assist control. The control unit is configured to: determine, based on the target information, whether an interference target which is liable to interfere with the safe exit of the occupant from the own vehicle during a vehicle stop is detected; determine, when a vehicle-exit assist condition which is satisfied at least when the interference target is detected is satisfied, whether a specific condition is satisfied, the specific condition being satisfied when at least a part of the interference target exists in a rear-side vehicle width region; execute the vehicle-exit assist control when the specific condition is not satisfied; and avoid executing the vehicle-exit assist control when the specific condition is satisfied.

2 Claims, 4 Drawing Sheets

(51) Int. Cl.
  _G08G 1/052_       (2006.01)
  _G08G 1/04_        (2006.01)

(56)            References Cited

FOREIGN PATENT DOCUMENTS

| JP | 2007-138457 A | 6/2007 |
| JP | 2018-8576 A | 1/2018 |
| JP | 2020-93567 A | 6/2020 |

* cited by examiner

[Fig. 1]
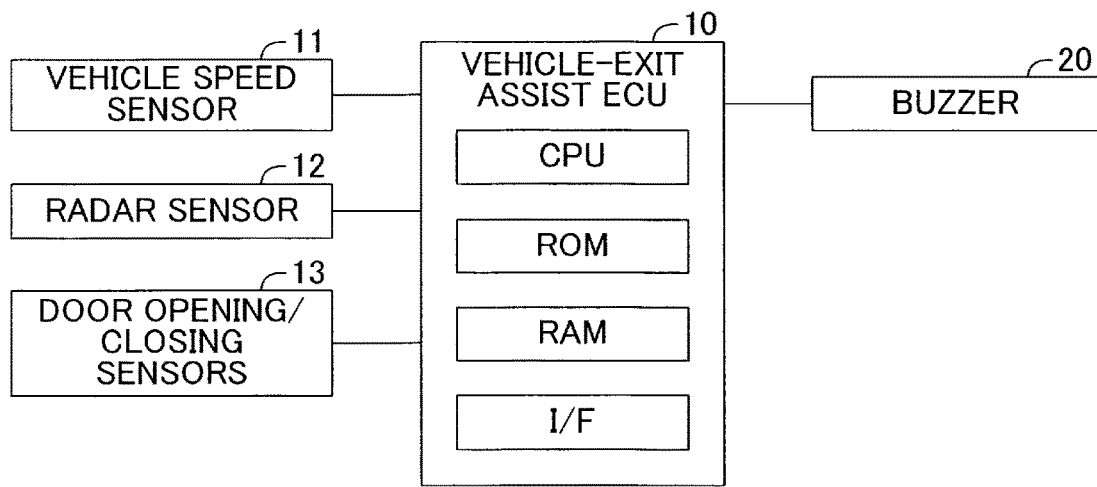
[Fig. 2]
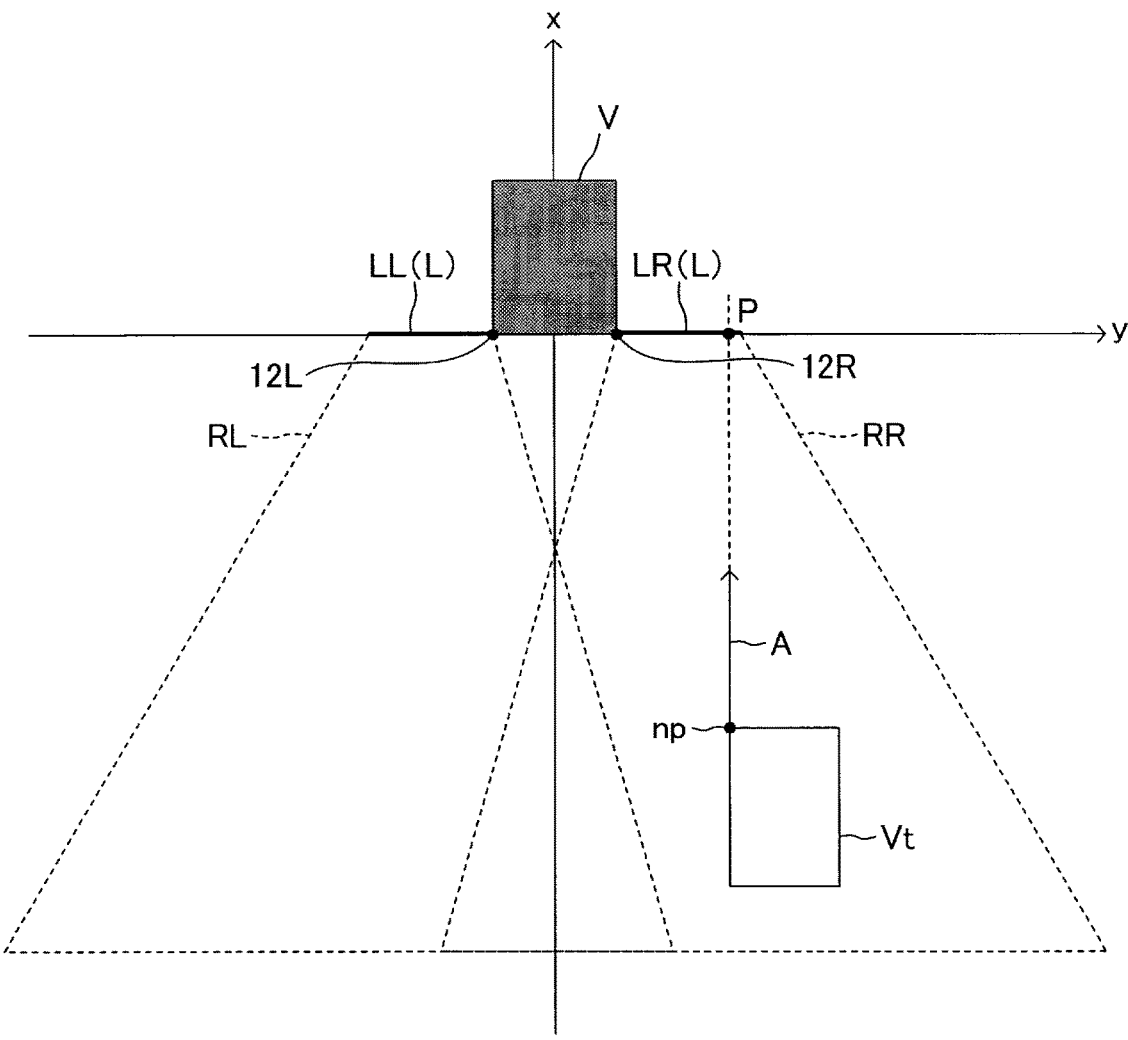

[Fig. 3]
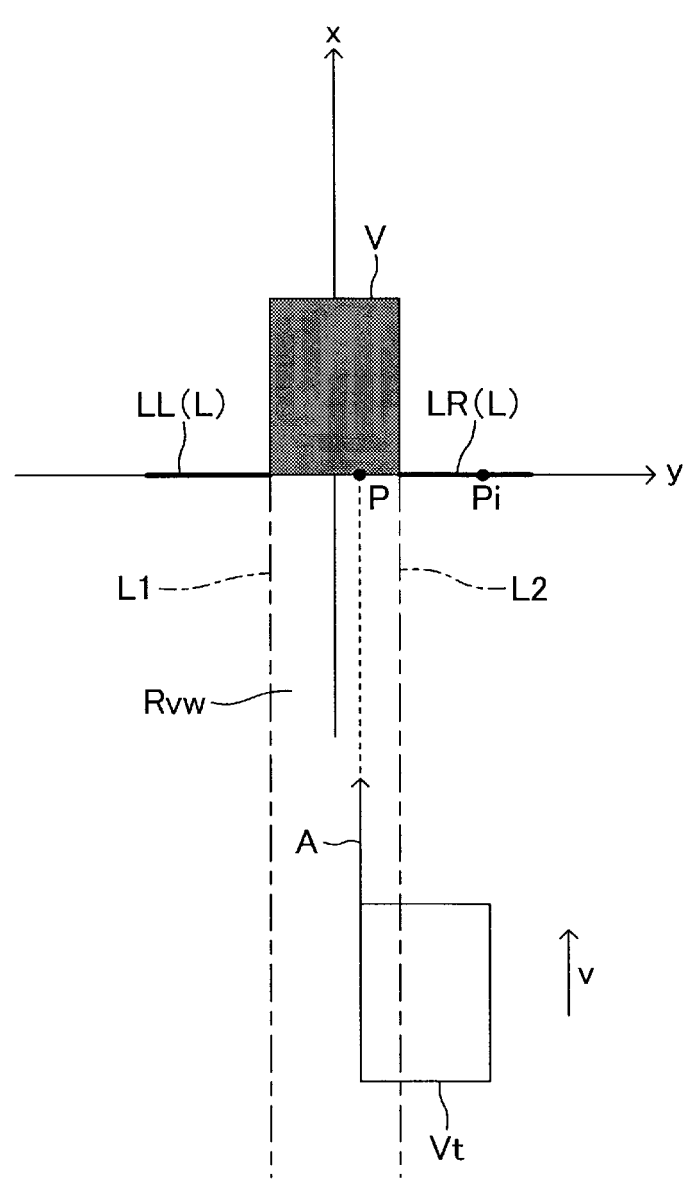

[Fig. 4]

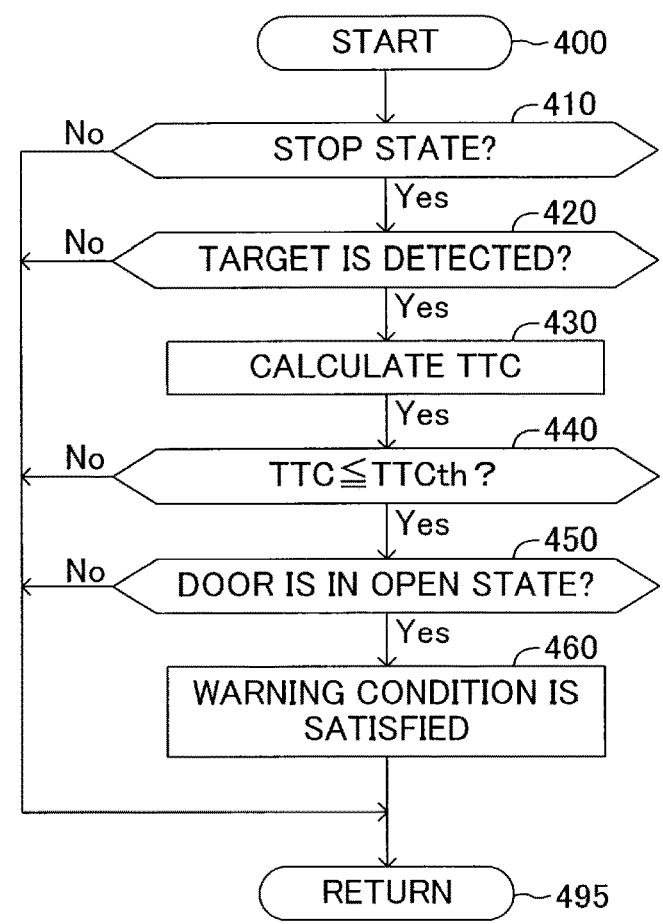

START ~400

STOP STATE? ~410
No ← / Yes ↓

TARGET IS DETECTED? ~420
No ← / Yes ↓

CALCULATE TTC ~430
Yes ↓

TTC≦TTCth? ~440
No ← / Yes ↓

DOOR IS IN OPEN STATE? ~450
No ← / Yes ↓

WARNING CONDITION IS SATISFIED ~460

RETURN ~495

[Fig. 5]

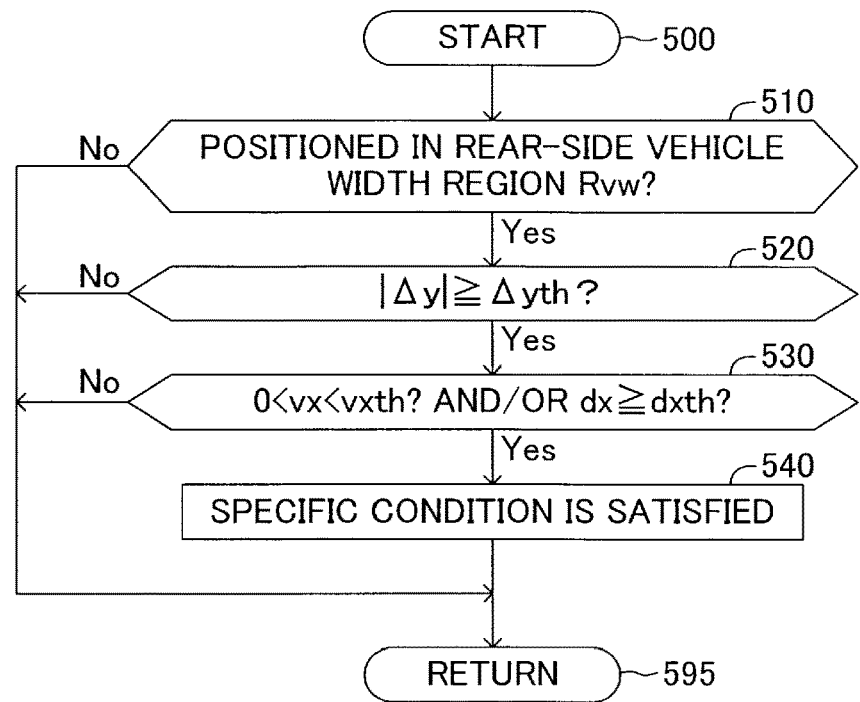

START ~500

POSITIONED IN REAR–SIDE VEHICLE WIDTH REGION Rvw? ~510
No ← / Yes ↓

$|\Delta y| \geqq \Delta yth$? ~520
No ← / Yes ↓

$0 < vx < vxth$? AND/OR $dx \geqq dxth$? ~530
No ← / Yes ↓

SPECIFIC CONDITION IS SATISFIED ~540

RETURN ~595

[Fig. 6]
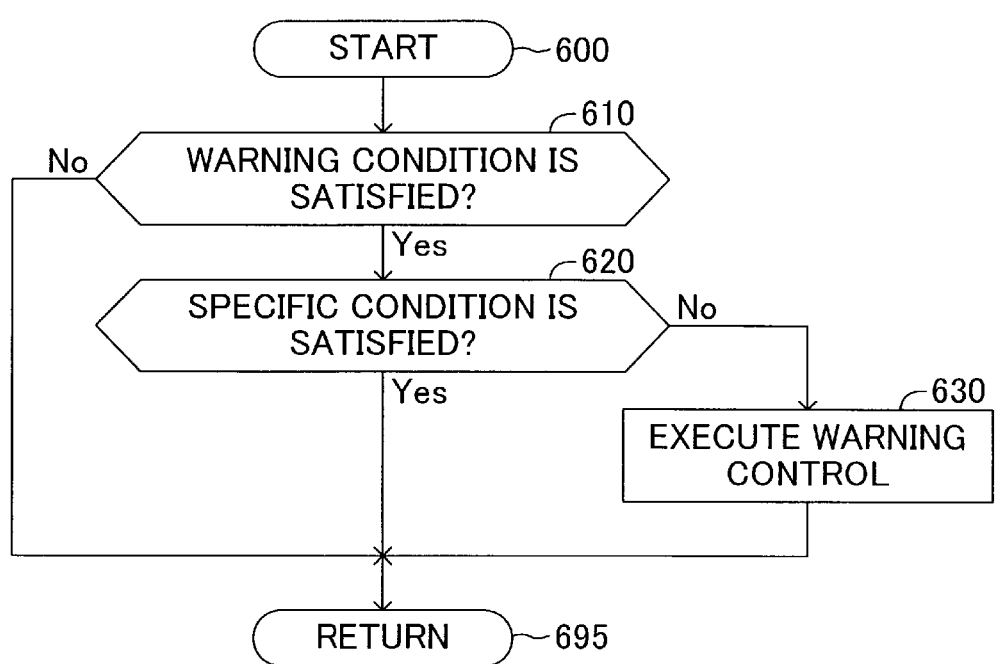

VEHICLE-EXIT ASSIST APPARATUS

CROSS-REFERENCE TO RELATED APPLICATIONS

This is a National Stage of International Application No. PCT/JP2022/030803 filed Aug. 12, 2022, claiming priority based on Romanian Patent Application No. a 2021 00606 filed Sep. 30, 2021.

TECHNICAL FIELD

The present invention relates to a vehicle-exit assist apparatus capable of suppressing unnecessary operation of vehicle-exit assist control.

BACKGROUND ART

Hitherto, there has been known a vehicle-exit assist apparatus capable of executing vehicle-exit assist control for assisting an occupant of a vehicle in safely exiting a vehicle. The vehicle-exit assist apparatus is configured to execute the vehicle-exit assist control, for example, when a vehicle-exit intention of the occupant is detected in a case in which there is detected an interference target which may interfere with the safe vehicle-exit of the occupant (that is, may pass on a side of the vehicle) during the stop of the vehicle.

For example, a vehicle door control device described in Japanese Patent Application Laid-open No. 2007-138457 includes passing object detection means for detecting an object passing on the side of a vehicle, and is configured to notify, when an object passing on the side of the vehicle is detected by the passing object detection means in a case in which a slide door of the vehicle is in an open state, an occupant of existence of the object, and to suppress an operation of opening the slide door.

The vehicle-exit assist apparatus includes "a target information acquisition device for detecting a target existing on a rear side of the vehicle, and acquiring information on the detected target as target information," and determines whether or not the detected target is an interference target based on the target information acquired by the target information acquisition device. The vehicle-exit assist apparatus typically determines whether or not the target is an interference target as described below.

That is, the vehicle-exit assist apparatus sets, as intersecting determination lines, virtual lines extending from left and right rear corner portions of the vehicle toward vehicle width outward directions (i.e., outward directions in a vehicle width direction), respectively, during the period in which the vehicle stops. After that, the vehicle-exit assist apparatus calculates a moving direction of the target based on the target information, and determines whether or not the target passes through the intersecting determination line within a predetermined period when the target continues to move along the moving direction. When the vehicle-exit assist apparatus determines that the target passes through the intersecting determination line within the predetermined period, the vehicle-exit assist apparatus determines that the target is an interference target.

Through the execution of the vehicle-exit assist control for the target determined as the interference target as described above, it is possible to reduce a possibility that the door or the occupant comes in contact with the interference target. Meanwhile, when this control is executed even in a scene in which the vehicle-exit assist control is not required, there is a possibility that the occupant is annoyed, and there is also a possibility that the safe vehicle-exit of the occupant is conversely interfered. Here, accuracy of the target information may decrease depending on detection precision of the target information acquisition device, resulting in an error in the calculation result of the moving direction of the target. As a result, even when the target does not actually intersect with the intersecting determination line after continuing to move along the current moving direction, there may be a case where the target is determined to be an interference target that passes through the intersecting determination line within the predetermined period. That is, "the scene in which the vehicle-exit assist control is not required" is such a scene that a target that does not actually corresponds to an interference target is erroneously detected as an interference target due to the occurrence of the error in the calculation result of the moving direction of the target. Thus, it is required to suppress the unnecessary operation of the vehicle-exit control, to thereby increase reliability of this control.

SUMMARY OF INVENTION

The present invention has been made in view of the above-mentioned problem. That is, one object of the present invention is to provide a vehicle-exit assist apparatus capable of suppressing unnecessary operation of vehicle-exit assist control.

According to at least one embodiment of the present invention (hereinafter "the present invention apparatus"), there is provided a vehicle-exit assist apparatus including: a target information acquisition device (12) configured to detect a target existing on a rear side of an own vehicle, and to acquire, as target information, information on the detected target; and a control unit (10) configured to execute vehicle-exit assist control of assisting an occupant of the own vehicle in safely exiting the own vehicle. The control unit (10) is configured to: determine, based on the target information, whether an interference target which is liable to interfere with the safe exit of the occupant from the own vehicle during a vehicle stop is detected; determine whether a vehicle-exit assist condition is satisfied, the vehicle-exit assist condition being satisfied at least when the interference target is detected; determine, when the vehicle-exit assist condition is satisfied, whether a specific condition is satisfied, the specific condition being satisfied when at least a part of the interference target exists in a rear-side vehicle width region (Rvw) being a region between a virtual line (L1) extending from a left rear corner portion of the own vehicle toward a rear direction (−x-axis direction) in a front-and-rear direction (x-axis direction) of the own vehicle and a virtual line (L2) extending from a right rear corner portion of the own vehicle toward the rear direction (−x-axis direction); execute the vehicle-exit assist control when the specific condition is not satisfied; and avoid executing the vehicle-exit assist control when the specific condition is satisfied.

The related-art vehicle-exit assist apparatus executes the vehicle-exit assist control, for example, when an execution condition, which is satisfied when the interference target is detected during the vehicle stop and the vehicle-exit intention of an occupant is detected, is satisfied. With this configuration, the vehicle-exit control is executed even when a target that does not actually correspond to an interference target is erroneously detected as an interference target due to an error in a calculation result of a moving direction of the target and the execution condition is consequently satisfied. Such execution of the vehicle-exit control thus causes unnecessary operation.

Here, the inventors of the present invention have found that when a target is erroneously detected as an interference target due to the occurrence of the error in the calculation result of the moving direction of the target, the target tends to be moving in a region extending on a directly rear side of the own vehicle. Based on this fining, when the vehicle-exit assist condition is satisfied, the present invention apparatus is configured not to immediately execute the vehicle-exit assist control, but to determine whether or not the specific condition, that is, the condition which is satisfied when at least a part of the interference target is positioned in the rear-side vehicle width region of the own vehicle, is satisfied. When the specific condition is not satisfied, the present invention apparatus is configured to determine that it is less liable that the target is erroneously detected as the interference target, and to execute the vehicle-exit assist control. When the specific condition is satisfied, the present invention apparatus is configured to determine that it is highly liable that the target is erroneously detected as the interference target due to the occurrence of the error in the calculation result of the moving direction of the target, and to avoid executing the vehicle-exit assist control.

With this configuration, the unnecessary operation of the vehicle-exit assist control can be suppressed while this control is appropriately executed in a scene in which this control is actually required, thereby being capable of increasing reliability of the vehicle-exit assist control.

According to at least one aspect of the present invention, of a front end portion of the interference target, a portion closest to the own vehicle in the vehicle width direction of the own vehicle is defined as a proximate portion (np), virtual lines that each have a predetermined length, are positioned on a reference axis (y-axis) passing through the left rear corner portion and the right rear corner portion of the own vehicle, and extend toward vehicle width outward directions from the left rear corner portion and the right rear corner portion, respectively, are defined as intersecting determination lines (LL, LR), and the control unit (10) is configured to: determine that the detected target is an interference target when an intersection between an extension line extending from the proximate portion (np) along a moving direction of the detected target and the reference axis (y-axis) is positioned on one of the intersecting determination lines (LL, LR), and a predicted period (TTC) predicted to be required for the detected target to reach the intersection is equal to or shorter than a predetermined period threshold value (TTCth); and determine that the specific condition is satisfied further when a magnitude ($|\Delta y|$) of a change amount per unit period of a position of the intersection is equal to or larger than a predetermined change amount threshold value ($\Delta yth$).

The inventors of the present invention have found that when a target is erroneously detected as an interference target due to the occurrence of the error in the calculation result of the moving direction, the magnitude of the change amount per unit period of the position of the intersection between the extension line extending from the proximate portion along the moving direction of the target and the reference axis tends to be relatively large. Based on this finding, the at least one aspect of the present invention is configured such that the specific condition is satisfied further when the magnitude of the change amount per unit period of the position of the intersection is equal to or larger than the change amount threshold value. With this configuration, the precision of the determination of whether or not the vehicle-exit control is the unnecessary operation becomes higher, and the vehicle-exit assist control can thus more appropriately be executed.

According to at least one aspect of the present invention, the control unit (10) is configured to determine that the specific condition is satisfied further when a component (vx) of a speed (v) of the interference target in the front-and-rear direction of the own vehicle is higher than 0 and is lower than a predetermined speed threshold value (vxth) and/or a component (dx) of a deceleration (d) of the interference target in the front-and-rear direction is equal to or higher than a predetermined deceleration threshold value (dxth).

The inventors of the present invention have found that when a target is erroneously detected as an interference target due to the occurrence of the error in the calculation result of the moving direction, the target tends to move at such a speed that "the component thereof in the front-and-rear direction of the own vehicle" has a relatively small value, and/or at such a deceleration that the component thereof in the front-and-rear direction has a relatively large value. Based on this finding, the at least one aspect of the present invention is configured such that the specific condition is satisfied further when the component of the speed of the interference target in the front-and-rear direction is higher than 0 and lower than the speed threshold value and/or the component of the deceleration of the interference target in the front-and-rear direction is equal to or higher than the deceleration threshold value. With this configuration, the precision of the determination of whether or not the vehicle-exit control is the unnecessary operation becomes still higher, and the vehicle-exit assist control can thus still more appropriately be executed.

In the description above, in order to facilitate understanding of the invention, reference symbols used in at least one embodiment of the present invention are enclosed in parentheses, and are assigned to each of constituent features of the invention corresponding to the at least one embodiment. However, each of the constituent features of the invention is not limited to the at least one embodiment prescribed by the reference symbols.

BRIEF DESCRIPTION OF DRAWINGS

FIG. 1 is a schematic configuration diagram of a vehicle-exit assist apparatus (present embodiment apparatus) according to at least one embodiment of the present invention.

FIG. 2 is a diagram for illustrating a 3D object detection range of a radar sensor included in the present embodiment apparatus, and is a diagram for illustrating a method of calculating a TTC of a target detected by the radar sensor.

FIG. 3 is a diagram for illustrating a specific condition, and is a diagram for exemplifying a case in which unnecessary operation of warning control is suppressed when a warning condition is satisfied.

FIG. 4 is a flowchart for illustrating a routine executed by a CPU of a vehicle-exit assist ECU of the present embodiment apparatus.

FIG. 5 is a flowchart for illustrating a routine executed by the CPU.

FIG. 6 is a flowchart for illustrating a routine executed by the CPU.

DESCRIPTION OF EMBODIMENTS (Configuration)

Referring to the accompanying drawings, a vehicle-exit assist device (hereinafter also referred to as "present embodiment apparatus") according to at least one embodiment of the present invention is described below. As illustrated in FIG. 1, the present embodiment apparatus includes a vehicle-exit assist ECU 10, and a vehicle speed sensor 11, a radar sensor 12, door opening/closing sensors 13, and a buzzer 20, which are connected to the vehicle-exit assist ECU 10. The vehicle-exit assist ECU 10 includes a micro-computer as a main component. The ECU is an abbreviation for "electronic control unit". The microcomputer includes CPU, ROM, RAM, interface (I/F), and the like, and the CPU is configured to execute instructions (programs and routines) stored in the ROM to achieve various functions. A vehicle to which the present embodiment apparatus is mounted is referred to as "own vehicle".

The vehicle-exit assist ECU 10 is configured to acquire signals generated or output by the sensors 11 to 13 each time a predetermined period elapses, and to control the buzzer 20 based on the acquired signals. The vehicle-exit assist ECU 10 is hereinafter simply also referred to as "ECU 10".

The vehicle speed sensor 11 generates a signal corresponding to a travel speed (hereinafter referred to as "vehicle speed") of the own vehicle. The ECU 10 acquires the signal generated by the vehicle speed sensor 11, and calculates the vehicle speed based on the signal. When the vehicle speed is zero, the ECU 10 determines that the own vehicle is in a stop state (hereinafter also referred to as "during the vehicle stop").

The radar sensor 12 (target information acquisition device) has a function of acquiring information on a 3D object (target) existing on a rear side (on a directly rear side and obliquely rear sides) of the own vehicle. The 3D object is a moving object such as a vehicle, a bicycle, a pedestrian, and the like.

As illustrated in FIG. 2, the radar sensor 12 includes a left radar sensor 12L provided in a left rear corner portion of an own vehicle V and a right radar sensor 12R provided in a right rear corner portion of the own vehicle V. The radar sensor 12 irradiates a radio wave in the millimeter waveband around the own vehicle. Specifically, the left radar sensor 12L irradiates the radio wave in a range including a left-side region RL on the left rear side of the own vehicle. The right radar sensor 12R irradiates the radio wave in a range including a right-side region RR on the right rear side of the own vehicle. Each of the left-side region RL and the right-side region RR has a shape extending outward and inward in a vehicle width direction as a position in the region becomes farther from the own vehicle V toward the rear side. In FIG. 2, for the sake of illustration, ratios of the regions RL and RR to the own vehicle V and the like are changed.

When a 3D object exists in the irradiation range of the radio wave, the radar sensor 12 receives a reflected wave from the 3D object. The radar sensor 12 calculates presence or absence of a 3D object and a relative relationship between the own vehicle and the 3D object (a distance from the own vehicle to the 3D object, an orientation of the 3D object with respect to the own vehicle, a relative speed of the 3D object with respect to the own vehicle, and the like) based on an irradiation timing, a reception timing of the radio wave, and the like. In other words, the radar sensor 12 detects a 3D object existing on the rear side of the own vehicle. The 3D object detected by the radar sensor 12 (that is, the 3D object existing in the region RL or RR) is hereinafter also referred to as "target." The radar sensor 12 outputs, as target information, those pieces of information on the target to the ECU 10.

The sensor for acquiring the target information is not limited to the radar sensor 12. For example, in addition to or in place of the radar sensor 12, a laser radar sensor, an ultrasonic sensor, and/or a camera sensor, and so on may be used. As another example, as the radar sensor 12, a sensor to be used for blind spot monitor control may be used. The blind spot monitor control is control of attracting attention of a driver of the own vehicle when a vehicle approaching the own vehicle from the rear side (in particular, a vehicle existing in a region which is hard to be checked through side mirrors) is detected.

Description is to be continued with reference again to FIG. 1. The door opening/closing sensor 13 is provided for each of a plurality of doors (in more detail, side doors) of the own vehicle. The door opening/closing sensor 13 detects an open state and a closed state of the door. When the door opening/closing sensor 13 detects that the door is in an open state, the door opening/closing sensor 13 generates, during a period in which the open state is being detected, an open signal indicating that the door is in the open state. When the door opening/closing sensor 13 detects that the door is in a closed state, the door opening/closing sensor 13 generates, during a period in which the closed state is being detected, a closed signal indicating that the door is in the closed state. The ECU 10 detects which of the open signal and the closed signal each door opening/closing sensor 13 is generating, and detects whether the door corresponding to the door opening/closing sensor 13 is in the open state or the closed state based on the detection result.

The buzzer 20 is built into a meter panel (not shown), and is configured to sound based on a drive command from the ECU 10.

(Details of Operation)

A related-art vehicle-exit assist apparatus is configured to execute the vehicle-exit assist control, for example, when a vehicle-exit intention of the occupant is detected in a case in which an interference target which is liable to interfere with the safe vehicle-exit of the occupant during the vehicle stop is detected. With this configuration, there is a possibility that a target that does not actually corresponds to an interference target is erroneously detected as an interference target due to an occurrence of an error in a calculation result of a moving direction of the target, and, as a result, unnecessary vehicle-exit assist control is executed.

Thus, the inventors of the present invention have configured the present embodiment apparatus as follows based on the finding that "the error in the calculation result of the moving direction of a target is liable to occur when the target is moving in a region extending on a directly rear side of the own vehicle". That is, in the case in which the interference target is detected during the vehicle stop and the vehicle-exit intention of the occupant is detected, when there is satisfied a specific condition (described below) being "a condition which is liable to be satisfied when an interference target is moving in the region extending on the directly rear side of the own vehicle," the present embodiment apparatus is configured to determine that the interference target does not actually correspond to an interference target, and to avoid executing the vehicle-exit assist control. In the at least one embodiment, the ECU 10 executes warning control as the vehicle-exit assist control. The warning control is control of executing processing of sounding the buzzer 20. A detailed description is now given of operation of the ECU 10.

When all of the following condition 1 to condition 3 are satisfied, the ECU 10 determines that a warning condition is satisfied. The warning condition corresponds to an example of "a vehicle-exit assist condition."

(Condition 1) The own vehicle is in the stop state.

(Condition 2) An interference target is detected.

(Condition 3) The door of the own vehicle is in the open state.

First, description is given of the condition 1. When the vehicle speed acquired from the vehicle speed sensor 11 is zero, the ECU 10 determines that the condition 1 is satisfied.

Description is now given of the condition 2. The "interference target" means a moving object which is liable to approach the own vehicle from the rear side to interfere with the safe vehicle-exit of the occupant (that is, to pass on the side of the own vehicle). The ECU 10 detects the interference target as described below. That is, when the ECU 10 determines that a target exists in the left-side region RL or the right-side region RR based on the target information acquired from the radar sensor 12, the ECU 10 calculates a predicted period that is predicted to be required for the target to come in contact with or to reach a position closest to the own vehicle. This predicted period is hereinafter also referred to as "time to collision (TTC)" for the convenience of description. When the TTC is equal to or shorter than a predetermined period threshold value TTCth, the ECU 10 detects this target as an interference target, and thus determines that the condition 2 is satisfied.

With reference to FIG. 2, a more detailed description is now given. FIG. 2 shows a state in which another vehicle Vt is approaching the own vehicle V from the rear side. As illustrated in FIG. 2, when the own vehicle is in the stop state (that is, the condition 1 is satisfied), the ECU 10 sets an xy coordinate system having an origin at a center between the left and right rear corner portions of the own vehicle V. The "x" axis extends in a front-and-rear direction of the own vehicle V. The "y" axis extends in the vehicle width direction (left and right direction) of the own vehicle V. That is, the "y" axis can be considered as an axis passing through the left and right rear corner portions of the vehicle V. In the at least one embodiment, the center of the left and right rear corner portions of the own vehicle V matches a center portion of a rear end of the own vehicle V. The "y" axis corresponds to an example of "a reference axis."

Moreover, the ECU 10 sets an intersecting determination line L to the own vehicle V when the own vehicle V is in the stop state. The intersecting determination line L is a virtual line set to calculate the TTC, and includes a left-side intersecting determination line LL and a right-side intersecting determination line LR. The left-side intersecting determination line LL extends from the left rear corner portion of the own vehicle V toward a −y-axis direction (toward the vehicle width outward direction) on the "y" axis. The right-side intersecting determination line LR extends from the right rear corner portion of the own vehicle V toward a +y-axis direction (toward the vehicle width outward direction) on the "y" axis. Lengths of the left and right intersecting determination lines LL and LR are the same as each other (for example, approximately 1.3 m), and are substantially equal to lengths of the regions RL and RR in the y-axis direction at the left and right rear corner portions of the own vehicle V. The lengths of the left and right intersecting determination lines LL and LR are set in advance through experiments or simulation to such a length that "when a target passes through any position on the determination line LL or LR during the vehicle-exit of the occupant from the own vehicle V, the target is liable to come in contact with the door or the occupant of the own vehicle V."

The ECU 10 calculates a speed vector A of the target (the another vehicle Vt in the example of FIG. 2) based on the target information when the own vehicle V is in the stop state, and sets a start point of the speed vector A to a proximate portion np of the target. The proximate portion np is a portion of a front end portion of the target which is closest to the own vehicle V in the y-axis direction. The speed vector A may be, for example, obtained through time differentiation of the position (distance and orientation) of the target.

When an extension line of the speed vector A of the target intersects with any one of the left and right intersecting determination lines LL and LR (that is, an intersection between the extension line and the "y" axis is positioned on the intersecting determination line L), the ECU 10 calculates, as the TTC, "a period predicted to be required for the target to intersect with the intersecting determination line L (that is, a period predicted for the target to reach the intersection between the extension line of the speed vector A of the target and the intersecting determination line L)." The TTC may be calculated through use of the target information by dividing, for example, "a distance from the proximate portion np to the intersection" by "a current speed of the target."

When the TTC in the case in which the target intersects with the left-side intersecting determination line LL in the future is equal to or lower than the TTCth, the ECU 10 determines that the target is liable to interfere with a safe vehicle-exit of the occupant from the door on the left side, and thus detects the target as an interference target for the door on the left side.

Meanwhile, when the TTC in the case in which the target intersects with the right-side intersecting determination line LR in the future is equal to or lower than the TTCth, the ECU 10 determines that the target is liable to interfere with a safe vehicle-exit of the occupant from the door on the right side, and thus detects the target as an interference target for the door on the right side.

In those cases, the ECU 10 determines that the condition 2 is satisfied.

Meanwhile, when the target intersects with any one of the left and right intersecting determination lines LL and LR in the future, but the TTC is longer than the TTCth, the ECU 10 determines that the target is not (currently) liable to interfere with the safe vehicle-exit of the occupant, and does not thus detect the target as an interference target.

In contrast, when the extension line of the speed vector A of the target intersects with none of the left and right intersecting determination lines LL and LR (that is, the intersection between the extension line and the "y" axis is not positioned on the intersecting determination line L), the TTC cannot be calculated, and the ECU 10 does not thus detect the target as an interference target.

In those cases, the ECU 10 determines that the condition 2 is not satisfied.

In the example of FIG. 2, the another vehicle Vt crosses the right-side intersecting determination line LR in the future in consideration of the speed vector A at the current time point. Thus, the ECU 10 calculates the TTC for the another vehicle Vt, detects the another vehicle Vt as an interference target for the door on the right side when the TTC is equal to or shorter than the TTCth, and does not detect the another vehicle Vt as an interference target when the TTC exceeds the TTCth.

Even when the extension line of the speed vector A of the target does not intersect with the intersecting determination line L, the ECU 10 calculates a "y" coordinate of the intersection with the "y" axis. Thus, when "y" coordinates of end points of the left and right intersecting determination lines LL and LR are denoted by −Ly and Ly, respectively, and the vehicle width of the own vehicle V is denoted by "w", the state in which "the extension line of the speed vector A of the target intersects with any one of the left and right intersecting determination lines LL and LR" is equivalent to a state in which "the 'y' coordinate of the intersection between the extension line of the speed vector A of the target and the 'y' axis satisfies −Ly≤y≤−w/2 or w/2≤y≤Ly."

Description is now given of the condition 3. When the ECU 10 determines that the door on the side on which the interference target is detected is in the open state based on the signal acquired from the door opening/closing sensors 13, the ECU 10 determines that the condition 3 is satisfied.

When the warning condition is satisfied, the ECU 10 determines whether or not the specific condition is satisfied for an interference target satisfying the warning condition. In general, detection precision of the radar sensor 12 tends to decrease when a target that is moving in "the region extending on the directly rear side of the own vehicle" is to be detected. When the target is moving in this region, at least a part of the target is overlapping the own vehicle in the y-axis direction. Assuming that the target is moving straight in the x-axis direction, when the target partially overlaps the own vehicle as described above, it is less liable that the target passes on the side of the own vehicle in the future. That is, the target hardly becomes an interference target. Meanwhile, when the target changes a travel direction, and passes on the side of the own vehicle in the future (that is, becomes an interference target), it is considered to be sufficient that the warning control is executed at the time when the travel direction is changed (that is, at the time when the target no longer overlaps the own vehicle). From the above, the inventors of the present invention have set the specific condition through experiments and/or simulation based on the finding that when a target detected as an interference target is moving in the region extending on the directly rear side of the own vehicle, the target does not actually correspond to an interference target (that is, it is highly liable that the error occurs in the calculation result of the moving direction of the target due to the detection precision of the radar sensor 12, and the target is thus erroneously detected as the interference target). In the at least one embodiment, the ECU 10 determines that the specific condition is satisfied when all of the following condition "a" to condition "c" are satisfied.

(Condition "a") At least a part of an interference target is positioned in a rear-side vehicle width region Rvw of the own vehicle.

(Condition "b") A magnitude |Δy| of a change amount per unit period of the "y" coordinate of the intersection between the extension line of the speed vector A of the interference target and the "y" axis is equal to or larger than a predetermined change amount threshold value Δyth.

(Condition "c") An x-axis component vx of the speed of the interference target is higher than 0 and is lower than a predetermined speed threshold value vxth, and/or an x-axis component dx of the deceleration of the interference target is equal to or higher than a predetermined deceleration threshold value dxth.

First, description is given of the condition "a". As illustrated in FIG. 3, the rear-side vehicle width region Rvw of the own vehicle V is defined as a region between a virtual line L1 extending from the left rear corner portion of the own vehicle V toward the −x-axis direction and a virtual line L2 extending from the right rear corner portion of the own vehicle V toward the −x-axis direction. That is, the rear-side vehicle width region Rvw extends on the directly rear side of the own vehicle. The condition "a" is satisfied when at least a part of an interference target is positioned in this rear-side vehicle width region Rvw (that is, when a "y" coordinate, which is in a coordinate group forming the interference target, and is closest to the "x" axis, satisfies a relationship of "−w/2≤y≤w/2"). Based on the experiments and/or the simulation, when a target is erroneously detected as an interference target, the target tends to be moving in the region extending on the directly rear side of the own vehicle. As a result, the condition "a" has been introduced.

The condition "a" may be configured such that the condition "a" is satisfied when the "y" coordinate of the proximate portion np satisfies the relationship of "−w/2≤y≤w/2". As another example, the condition "a" may be configured such that the condition "a" is satisfied when an entrance ratio of the interference target into the rear-side vehicle width region Rvw is equal to or higher than a predetermined entrance ratio threshold value. Here, the entrance ratio can be calculated by dividing "a length of the portion of the interference target overlapping the own vehicle V in the 'y' axis direction" by "the vehicle width 'w' of the own vehicle V".

Description is now given of the condition "b". As described above, when a target is detected by the radar sensor 12, the ECU 10 calculates the "y" coordinate of the intersection between the extension line of the speed vector A of the target and the "y" axis based on the target information. After that, when the target is detected as an interference target, the ECU 10 calculates the magnitude |Δy| of the change amount per unit period of the "y" coordinate of the intersection (hereinafter also simply referred to as "magnitude |Δy| of the change amount"). The condition "b" is satisfied when the interference target satisfies a relationship of "|Δy|≥Δyth". Based on the experiments and/or the simulation, when a target is erroneously detected as an interference target, the magnitude |Δy| of the change amount tends to be relatively large. It is considered that this is because when a target is erroneously detected as an interference target, an error has occurred in the calculation result of the moving direction of the target due to the detection precision of the radar sensor 12, and the position of the intersection thus tends to change (is unstable). As a result, the condition "b" has been introduced.

The change amount threshold value Δyth is set to such a value that when a target is erroneously detected as an interference target, the relationship of "|Δy|≥Δyth" is likely to be satisfied, and when the moving direction of the target is accurately calculated, the relationship of "|Δy|≥Δyth" is less likely to be satisfied. Moreover, the unit period can be set to an appropriate value through experiments and/or simulation.

Description is now given of the condition "c". The condition "c" is satisfied when the interference target satisfies a relationship of "0<vx<vxth" and/or a relationship of "dx≥dxth". According to the experiments and/or the simulation, when a target is erroneously detected as an interference target, the target tends to move at the speed "v" where a speed vx being a component of the speed v in the x-axis direction is relatively low and/or at the deceleration "d" where a deceleration dx being a component of the deceleration d in the x-axis direction is relatively high. As a result, the condition "c" has been introduced. The deceleration "d"

is a value that represents a degree of deceleration of the own vehicle, is equal to or larger than 0, and increases as a braking force acting on the own vehicle increases.

The speed threshold value vxth is set to such a value that when a target is erroneously detected as an interference target, a relationship of "vx<vxth" is likely to be satisfied, and when the moving direction of the target is accurately calculated, the relationship of "vx<vxth" is less likely to be satisfied. Similarly, the deceleration threshold value dxth is set to such a value that when a target is erroneously detected as an interference target, the relationship of "dx≥dxth" is likely to be satisfied, and when the moving direction of the target is accurately calculated, the relationship of "dx≥dxth" is less likely to be satisfied.

When all of the condition "a" to the condition "c" are satisfied, (a target determined as) an interference target is highly likely to be moving in the region extending on the directly rear side of the own vehicle. That is, the specific condition is a condition that is highly likely to be satisfied when an interference target is moving in the region extending on the directly rear side of the own vehicle. When the specific condition is satisfied, the ECU 10 determines that "a target determined as an interference target as a result of the satisfaction of the condition 2" does not actually correspond to an interference target (that is, the condition 2 is satisfied only due to the error in the calculation result of the moving direction of the target), and thus does not execute the warning control. Meanwhile, when the specific condition is not satisfied, the ECU 10 determines that the target is not moving in the region extending on the directly rear side of the own vehicle or the target is moving in this region but moving only for a purpose of crossing a lane (own lane) in which the own vehicle is positioned (that is, determines that the target is highly likely to be an actual interference target), and thus executes the warning control.

With reference to FIG. 3, description is now given of actions and effects of the specific condition. FIG. 3 is a diagram for illustrating a state in which the another vehicle Vt is traveling straight toward the +x-axis direction and is thus approaching the own vehicle from the rear side under a state in which the occupant has opened the door on the right side and is exiting the own vehicle V during the vehicle stop (that is, under a state in which the condition 1 and the condition 3 are satisfied).

As illustrated in FIG. 3, the extension line of the speed vector A of the another vehicle Vt does not actually intersect with the intersecting determination line L (that is, the intersection (point P) between the extension line and the "y" axis is not positioned on the intersecting determination line L). Thus, the another vehicle Vt does not correspond to an interference target at least at the current time. In other words, it is not required to execute the warning control for the another vehicle Vt. However, in this example, the error occurs in the calculation result of the moving direction of the another vehicle Vt due to the detection precision of the radar sensor 12, and, as a result, the ECU 10 erroneously calculates the intersection between the extension line of the speed vector A and the "y" axis as not the point P, but a point Pi (a point on the right-side intersecting determination line LR). In this example, the relationship of "TTC≤TTCth" is satisfied for the another vehicle Vt. Thus, the another vehicle Vt is detected as an interference target (that is, the condition 2 is satisfied).

As a result, the warning condition is satisfied, and the ECU 10 thus determines whether or not the specific condition is satisfied. In this example, a left side portion of the another vehicle Vt is positioned in the rear-side vehicle width region Rvw of the own vehicle V (condition "a"). Moreover, the intersection is erroneously calculated as not the point P, but the point Pi, and the relationship of "|Δy|≥Δyth" is thus satisfied (condition "b"). Further, the another vehicle Vt is traveling at a relatively low speed so that the another vehicle Vt does not collide with the own vehicle V, and the relationship of "0<vx<vxth" is satisfied (condition "c"). Thus, the ECU 10 determines that the specific condition is satisfied, and does not thus execute the warning control for the another vehicle Vt. That is, in the example of FIG. 3, even in the case in which the another vehicle Vt is detected as an interference target and the warning condition is consequently satisfied, when the specific condition is satisfied, the ECU 10 determines that the another vehicle Vt is erroneously detected as the interference target due to the occurrence of the error in the calculation result of the moving direction of the vehicle Vt, and does not thus execute the warning control. With this configuration, the unnecessary operation of the warning control is suppressed.

In the example of FIG. 3, the another vehicle Vt is traveling at a relatively low speed. However, in place of or in addition to the travel of the another vehicle Vt at the relatively low speed, also when the another vehicle Vt is traveling at a relatively high deceleration so that the another vehicle Vt does not collide with the own vehicle V, and the relationship of "dx≥dxth" is consequently satisfied, the condition "c" is satisfied, and the specific condition is thus satisfied.

Moreover, the specific condition includes the condition "b" and/or the condition "c". Thus, even when the condition "a" is satisfied (that is, an interference target is positioned in the rear-side vehicle width region Rvw), when the interference target is moving in the rear-side vehicle width region Rvw only for the purpose of crossing the own lane, the condition "b" and/or the condition "c" (in particular, the condition "c") is less likely to be satisfied, and the specific condition is not thus satisfied. Consequently, the ECU 10 executes the warning control. With this configuration, when a target actually corresponds to an interference target, the warning control is appropriately executed. In other words, due to the introduction of the specific condition, a situation in which the warning control is not executed even in a scene in which this control is actually required is less liable to occur.

The state exemplified in FIG. 3 may typically occur in a county in which left-hand traffic is required (a county in which there is adopted a lane layout in which an opposing lane is positioned on the right side with respect to a travel lane). A similar state may occur in a county in which right-hand traffic is required (a country in which there is adopted a lane layout in which an opposing lane is positioned on the left side with respect to the travel lane) when the occupant of the own vehicle V has opened the door on the left side, and is exiting the own vehicle V under the state in which the another vehicle Vt is displaced symmetrically about the "x" axis. However, the state in which the unnecessary operation of the warning control occurs in the county in which the left-hand traffic is required is not limited to the state in which the occupant exits from the door on the right side, but may be a state in which the occupant exits from the door on the left side (for example, a case in which the occupant exits from the vehicle in a parking lot). This applies to the country in which the right-hand traffic is required.

The related-art vehicle-exit assist apparatus executes the warning control when the warning condition is satisfied. As a result, when a target not actually corresponding to an interference target is erroneously detected as an interference target due to the occurrence of the error in the calculation result of the moving direction of the target, the warning control is executed, resulting in the unnecessary operation. In contrast, as cx-amplified in FIG. 3, when the warning condition is satisfied, the present embodiment apparatus does not immediately execute the warning control, but determines whether or not the specific condition is satisfied, and executes the warning control only when the specific condition is not satisfied. As a result, while the warning control is appropriately executed in the scene in which this control is actually required, the unnecessary operation of this control can be suppressed, thereby being capable of increasing reliability of the warning control.

(Specific Operation)

Description is now given of a specific operation of the ECU 10. The CPU of the ECU 10 is configured to repeatedly execute routines represented as flowcharts of FIG. 4 to FIG. 6 in the stated order each time a predetermined period elapses during a period (described below) in which electric power is supplied to the ECU 10.

The CPU starts processing from Step 400 of FIG. 4 at a predetermined timing, and the process proceeds to Step 410. In Step 410, the CPU determines whether or not the own vehicle is in the stop state based on the vehicle speed acquired from the vehicle speed sensor 11 (condition 1). When the own vehicle is in the travel state, the CPU makes a determination of "No" in Step 410 (that is, determines that the condition 1 is not satisfied (the warning condition is not satisfied)), and the process proceeds to Step 495. Then, the CPU temporarily finishes this routine. Meanwhile, when the own vehicle is in the stop state, the CPU makes a determination of "Yes" in Step 410 (that is, determines that the condition 1 is satisfied), and the process proceeds to Step 420.

In Step 420, the CPU determines whether or not a target is detected based on the target information acquired from the radar sensor 12. When a target is not detected, the CPU makes a determination of "No" in Step 420, and the process proceeds to Step 495. Then, the CPU temporarily finishes this routine. Meanwhile, when a target is detected, the CPU makes a determination of "Yes" in Step 420, and the process proceeds to Step 430.

In Step 430, the CPU calculates the speed vector A of the detected target based on the target information, and when the extension line of the speed vector A intersects with any one of the left and right intersecting determination lines LL and LR, the CPU calculates the TTC for the target. After that, the process proceeds to Step 440.

In Step 440, the CPU determines whether or not the relationship of "TTC≤TTCth" is satisfied for the detected target (condition 2). When a relationship of "TTC>TTCth" is satisfied, the CPU makes a determination of "No" in Step 440 (that is, determines that the condition 2 is not satisfied (the warning condition is not satisfied)), and the process proceeds to Step 495. Then, the CPU temporarily finishes this routine. Meanwhile, when the relationship of "TTC≤TTCth" is satisfied, the CPU makes a determination of "Yes" in Step 440 (that is, determines that the condition 2 is satisfied (the target is an interference target)), and the process proceeds to Step 450.

In Step 450, the CPU determines whether or not the door (the door on the side on which the interference target is detected) is in the open state based on the signal acquired from the door opening/closing sensor 13. When the door is in the closed state, the CPU makes a determination of "No"

in Step 450 (that is, determines that the condition 3 is not satisfied (the warning condition is not satisfied)), and the process proceeds to Step 495. Then, the CPU temporarily finishes this routine. Meanwhile, when the door is in the open state, the CPU makes a determination of "Yes" in Step 450 (that is, determines that the condition 3 is satisfied), and the process proceeds to Step 460. In Step 460, the CPU determines that the warning condition is satisfied. After that, the process proceeds to Step 495, and the CPU temporarily finishes this routine.

When the CPU determines that the warning condition is satisfied in Step 460, the CPU starts processing from Step 500 of FIG. 5, and the process proceeds to Step 510. In Step 510, the CPU determines whether or not at least a part of the target for which the determination of "Yes" is made in Step 440 of FIG. 4 (that is, the interference target) is positioned in the rear-side vehicle width region Rvw (condition "a"). When the interference target is not positioned in the rear-side vehicle width region Rvw, the CPU makes a determination of "No" in Step 510 (that is, determines that the condition "a" is not satisfied (the specific condition is not satisfied)), and the process proceeds to Step 595. Then, the CPU temporarily finishes this routine. Meanwhile, when at least a part of the interference target is positioned in the rear-side vehicle width region Rvw, the CPU makes a determination of "Yes" in Step 510 (that is, determines that the condition "a" is satisfied), and the process proceeds to Step 520.

In Step 520, the CPU determines whether or not the interference target satisfies the relationship of "|Δy|≥Δyth" (condition "b"). When a relationship of "|Δy|<Δyth" is satisfied, the CPU makes a determination of "No" in Step 520 (that is, determines that the condition "b" is not satisfied (the specific condition is not satisfied)), and the process proceeds to Step 595. Then, the CPU temporarily finishes this routine. Meanwhile, when the relationship of "|Δy|≥Δyth" is satisfied, the CPU makes a determination of "Yes" in Step 520 (that is, determines that the condition "b" is satisfied), and the process proceeds to Step 530.

In Step 530, the CPU determines whether or not the interference target satisfies the relationship of "0<vx<vxth" and/or the relationship of "dx≥dxth" (condition "c"). When a relationship of "vx≥vxth" and a relationship of "0≤dx<dxth or ax≥0" (ax: an "x" axis component of an acceleration of the interference target) are satisfied, the CPU makes a determination of "No" (that is, determines that the condition "c" is not satisfied (the specific condition is not satisfied)) in Step 530, and the process proceeds to Step 595. Then, the CPU temporarily finishes this routine. Meanwhile, when the relationship of "0<vx<vxth" and/or the relationship of "dx≥dxth" is satisfied, the CPU makes a determination of "Yes" in Step 530 (that is, determines that the condition "c" is satisfied), and the process proceeds to Step 540. In Step 540, the CPU determines that the specific condition is satisfied. After that, the process proceeds to Step 595, and the CPU temporarily finishes this routine.

After that, the CPU starts processing from Step 600 of FIG. 6, and the process proceeds to Step 610. In Step 610, the CPU determines whether or not the warning condition is satisfied based on the determination result of the routine of FIG. 4. When the warning condition is not satisfied (when the determination of "No" is made in any one of Step 410, Step 420, Step 440, and Step 450), the CPU makes a determination of "No" in Step 610, and the process proceeds to Step 695. Then, the CPU temporarily finishes this routine. That is, the CPU does not execute the warning control. Meanwhile, when the warning condition is satisfied (Step

460), the CPU makes a determination of "Yes" in Step 610, and the process proceeds to Step 620.

In Step 620, the CPU determines whether or not the specific condition is satisfied based on the determination result of the routine of FIG. 5. When the specific condition is not satisfied (when the determination of "No" is made in any one of Step 510, Step 520, and Step 530), the CPU makes a determination of "No" in Step 620 (that is, determines that the current state is the state in which the warning control is required), and the process proceeds to Step 630. In Step 630, the CPU transmits the drive command to the buzzer 20, to thereby sound the buzzer 20. As a result, the warning control is executed. After that, the process proceeds to Step 695, and the CPU temporarily finishes this routine.

Meanwhile, when the specific condition is satisfied (Step 540), the CPU makes a determination of "Yes" in Step 620 (that is, determines that the warning condition is satisfied only due to the erroneous detection of the target not actually corresponding to an interference target as an interference target due to the occurrence of the error in the calculation result of the moving direction of the target), and the process proceeds to Step 695. Then, the CPU temporarily finishes this routine. That is, the CPU does not execute the warning control. As a result, while the warning control is appropriately executed in the scene in which this control is actually required, the unnecessary operation of this control can be suppressed, thereby being capable of increasing the reliability of the warning control. After that, the process proceeds to Step 695, and the CPU temporarily finishes this routine.

The supply of electric power to the ECU 10 is continued until a predetermined condition is satisfied even after an ignition switch is turned off. This condition may be configured such that this condition is satisfied, for example, when the door is locked, or when a predetermined vehicle stop period has elapsed since the stop of the own vehicle. With this configuration, it is possible to reduce a possibility that the warning control is not executed in the scene in which this control is required, thereby being capable of more appropriately executing the warning control.

In the above, the vehicle-exit assist apparatus according to the at least one embodiment has been described, but the present invention is not limited to the above-mentioned at least one embodiment, and various changes are possible within the range not departing from the object of the present invention.

For example, in the at least one embodiment, the specific condition is satisfied when all of the condition "a" to the condition "c" are satisfied, but the requirement for the satisfaction of the specific condition is not limited thereto. For example, the specific condition may be configured such that the specific condition is satisfied when the condition "a" is satisfied. When at least a part of an interference target exists in the rear-side vehicle width region Rvw in the case in which the warning condition is satisfied, the target is highly likely to be erroneously detected as the interference target due to the error occurring in the calculation result of the moving direction of the target. Thus, even when the specific condition is configured such that the specific condition is satisfied when only the condition "a" is satisfied, the unnecessary operation of the warning control can be suppressed. As another example, the specific condition may be configured such that the specific condition is satisfied when the condition "a" and the condition "b" are satisfied, or when the condition "a" and the condition "c" are satisfied.

Moreover, in the at least one embodiment, the warning control is executed as the vehicle-exit assist control, but the type of the vehicle-exit assist control is not limited thereto.

For example, door opening limiting control of limiting a degree of the opening of the door or door lock control of locking the door may be executed as the vehicle-exit assist control. As another example, in addition to the warning control, the door opening limiting control or the door lock control may be executed as the vehicle-exit assist control.

Further, in the at least one embodiment, the processing of sounding the buzzer 20 is executed as the warning control, but the processing contents of the warning control is not limited thereto. For example, the following processing may be executed as the warning control in place of or in addition to the processing of sounding the buzzer 20, specifically, processing of turning on a side mirror indicator (indicator provided at a predetermined position of each of the left and right side mirrors of the own vehicle) on the side on which an interference target is detected, processing of displaying a predetermined mark (for example, a mark for clearly indicating from which direction of the left rear side or the right rear side an interference target is approaching) on the meter panel, and/or processing of causing a speaker (a component of a navigation system) to utter a predetermined message (for example, a message of "warning, approaching vehicle").

Further, in the at least one embodiment, the condition 2 is satisfied at the time when the relationship of "TTC≤TTCth" is satisfied for a target, but the requirement for satisfaction of the condition 2 is not limited thereto. For example, the condition 2 may be configured to be satisfied when the relationship of "TTC≤TTCth" is continuously satisfied for a target for a predetermined continuation period. Moreover, the condition 3 may be configured to be satisfied when the door on the side on which an interference target is detected is changed from the closed state to the open state. As another example, the condition 3 may be configured to be satisfied when a behavior of the occupant of operating a door operation unit (typically, an inner lever of the door) is detected based on image data taken by a camera inside the vehicle (camera capable of imaging the occupant inside the vehicle).

Moreover, the warning condition is satisfied when all of the condition 1 to the condition 3 are satisfied in the at least one embodiment, but the requirement for the satisfaction of the warning condition is not limited thereto. For example, the warning condition is not required to include the condition 3, and may thus be configured to be satisfied when the condition 1 and the condition 2 are satisfied. In other words, the warning control may be configured to be executed irrespective of whether or not the occupant has the vehicle-exit intention.

As another example, the warning control may be executed in two steps. Specifically, the warning control includes two types of control, that is, normal warning control and low-degree warning control (control lower in a degree of assistance than the normal warning control). The low-degree warning control is, for example, control of executing the above-mentioned processing of turning on the side mirror indicator. The normal warning control is, for example, control of executing, in addition to the processing of turning on the side mirror indicator, at least one of "the processing of sounding the buzzer, the processing of displaying the mark on the meter panel, or the processing of causing the speaker to utter a message." The low-degree warning control is executed when the condition 1 and the condition 2 are satisfied (that is, when an interference target is detected during the vehicle stop, but the door is in the closed state). The normal warning control is executed when, in addition to the condition 1 and the condition 2, the condition 3 is satisfied (that is, when an interference target is detected and the door is in the open state during the vehicle stop).

When the door is in the closed state, it is not possible to determine whether or not the occupant is exiting from this door. In other words, there are considered both of a possibility that the occupant has the vehicle-exit intention but has not just opened the door currently, and a possibility that the occupant does not have the vehicle-exit intention and the door is maintained in the closed state. Thus, when the door is in the closed state, it is possible to simultaneously achieve, through the execution of the low-degree warning control, "notifying in advance the occupant having the vehicle-exit intention of the existence of the interference target" and "avoiding, due to the execution of the normal warning control, a sense of discomfort is felt by the occupant who does not have the vehicle-exit intention".

When all of the condition 1 to the condition 3 are satisfied, in place of the normal warning control, the door opening limiting control or the door lock control may be executed as the vehicle-exit assist control. As another example, in addition to the normal warning control, the door opening limiting control or the door lock control may be executed as the vehicle-exit assist control.

Further, in the configuration of the at least one embodiment, the intersecting determination line L is introduced, and an interference target is detected based on the TTC of a target, but the detection method for an interference target is not limited thereto. For example, there may be set virtual areas (in more details, areas in the irradiation range of the radar sensor 12) each having a predetermined size and shape on the rear side of the own vehicle (typically, on the left rear side and the right rear side), and when a target detected by the radar sensor 12 is positioned in one of the virtual areas, the target may be detected as an interference target. In this case, the shape of the area is not particularly limited, and may be, for example, a trapezoidal shape or a rectangular shape.

The invention claimed is:

1. A vehicle-exit assist apparatus, comprising:
   a target information acquisition device configured to detect a target existing on a rear side of an own vehicle, and to acquire, as target information, information on the detected target; and
   a control unit configured to execute vehicle-exit assist control of assisting an occupant of the own vehicle in safely exiting the own vehicle,
   wherein the control unit is configured to:
      determine, based on the target information, whether an interference target which is liable to interfere with the safe exit of the occupant from the own vehicle during a vehicle stop is detected;
      determine whether a vehicle-exit assist condition is satisfied, the vehicle-exit assist condition being satisfied at least when the interference target is detected;

determine, when the vehicle-exit assist condition is satisfied, whether a specific condition is satisfied, the specific condition being a condition to be satisfied when at least a part of the interference target exists in a rear-side vehicle width region being a region between a virtual line extending from a left rear corner portion of the own vehicle toward a rear direction in a front-and-rear direction of the own vehicle and a virtual line extending from a right rear corner portion of the own vehicle toward the rear direction;
      execute the vehicle-exit assist control when the specific condition is not satisfied; and
      avoid executing the vehicle-exit assist control when the specific condition is satisfied,
   wherein, of a front end portion of the interference target, a portion closest to the own vehicle in a vehicle width direction of the own vehicle is defined as a proximate portion,
   virtual lines that each have a predetermined length, are positioned on a reference axis passing through the left rear corner portion and the right rear corner portion of the own vehicle, and extend toward vehicle width outward directions from the left rear corner portion and the right rear corner portion, respectively, are defined as intersecting determination lines; and
   the control unit is further configured to:
      determine that the detected target is an interference target when an intersection between an extension line extending from the proximate portion along a moving direction of the detected target and the reference axis is positioned on one of the intersecting determination lines, and a predicted period predicted to be required for the detected target to reach the intersection is equal to or shorter than a predetermined period threshold value; and
      determine that the specific condition is satisfied further when a magnitude of a change amount per unit period of a position of the intersection is equal to or larger than a predetermined change amount threshold value.

2. The vehicle-exit assist apparatus according to claim 1, wherein the control unit is configured to determine that the specific condition is satisfied further when a component of a speed of the interference target in the front-and-rear direction of the own vehicle is higher than 0 and is lower than a predetermined speed threshold value and/or a component of a deceleration of the interference target in the front-and-rear direction is equal to or higher than a predetermined deceleration threshold value.

* * * * *